United States Patent [19]

Morscheck

[11] 4,246,993
[45] Jan. 27, 1981

[54] SYNCHRONIZER FOR TRANSMISSIONS

[75] Inventor: Timothy J. Morscheck, Lathrup Village, Mich.

[73] Assignee: Eaton Corporation, Cleveland, Ohio

[21] Appl. No.: 901,544

[22] Filed: May 1, 1978

[51] Int. Cl.³ .............................................. F16D 13/24
[52] U.S. Cl. .................................................... 192/53 F
[58] Field of Search ........................... 192/53 F, 53 E

[56] References Cited

U.S. PATENT DOCUMENTS

| | | | |
|---|---|---|---|
| 1,761,966 | 6/1930 | Blackmore | 192/53 F |
| 1,931,288 | 10/1933 | Griswold | 192/53 F |
| 1,997,056 | 4/1935 | Griswold | 192/53 F |
| 2,259,527 | 10/1941 | Manville | 192/53 F |
| 2,392,520 | 4/1946 | Benz et al. | 192/53 F X |
| 2,413,675 | 1/1947 | Baker | 192/53 F |
| 3,078,975 | 2/1963 | Eaton | 192/53 E |
| 3,175,413 | 3/1965 | Peras | 74/339 |
| 3,228,499 | 1/1966 | Peras | 192/53 F |
| 3,265,173 | 8/1966 | Russell | 192/108 X |
| 3,924,484 | 12/1975 | Richards | 192/53 F X |

FOREIGN PATENT DOCUMENTS 1555158  1/1971  Fed. Rep. of Germany ......... 192/53 F

*Primary Examiner*—Rodney H. Bonck
*Attorney, Agent, or Firm*—R. J. McCloskey; D. Wood; P. S. Rulon

[57] ABSTRACT

A compact device for synchronizing the rotational speed of a gear with a shaft in a transmission. The device comprises a friction clutch including first and second cone clutch members, a positive clutch including first and second jaw clutch members, a plurality of springs reacting between the second members for biasing the second cone member toward engagement with the first cone member, a stop means for preventing engagement of the second cone with the first cone member until initial sliding movement of the first jaw member, and a blocker means for preventing engagement of the positive clutch until the friction clutch brings the gear to substantial synchronism with the shaft. The second jaw member includes an outer circumferential surface which supports an inner circumferential surface of the second cone member. The blocker means, which are defined on the outer and inner circumferential surfaces, allow limited relative rotation of the second cone clutch member on the second jaw member and prevent sliding movement of the second jaw member into engagement with the first jaw member until substantial synchronism is reached. Initial movement of the second jaw member engages the friction clutch through the springs; thereafter, force for engaging the friction clutch is transmitted through the blocker.

10 Claims, 3 Drawing Figures

SYNCHRONIZER FOR TRANSMISSIONS

CROSS-REFERENCE TO RELATED APPLICATION

U.S. patent application Ser. No. 884,078 for Automatic Transmission, filed on Mar. 3, 1978, and assigned to the assignee of this application, is incorporated herein by reference. The synchronizer disclosed herein has particular utility in such a transmission.

FIELD OF THE INVENTION

This invention relates to a coupling device for a transmission and more specifically a coupling device including a friction clutch for synchronizing two members, a jaw clutch for positive coupling of the members, and a blocker for preventing positive coupling until synchronism is reached.

BACKGROUND OF THE INVENTION

Coupling devices of the general type disclosed herein are well known in the prior art; such devices are commonly referred to as synchronizers. Prior art synchronizers, though well known for their value in preventing clashing or grinding of gears or jaw clutches in transmissions, have an inherent bulkiness which precludes their use in some transmissions not specifically designed or redesigned to provide for their use. This bulkiness may manifest itself in the axial and/or radial dimensions of the synchronizer. When the axial extent of a synchronizer on a shaft is large, the axial spacing between gears on the shaft and gears meshing therewith must be increased, thereby requiring an increase in the transmission design length. When the radial extent of a synchronizer on a transmission shaft is large, it may interfere with the placement of a gear on another shaft of the transmission, thereby requiring an increase in the transmission design width and/or length. Such increases in the size of a transmission not only increases the total manufacturing cost of the transmission per se, but also may preclude the installation of, or increase the installation cost of, the transmission in some vehicles.

SUMMARY OF THE INVENTION

An object of this invention is to provide a compact synchronizer.

Another object of this invention is to provide a compact synchronizer which is capable of providing synchronizer torques equal to or greater than synchronizers which are much bulkier.

According to a feature of the invention, the synchronizer includes a first jaw clutch member and a first friction clutch member rotatable about a common axis and axially moveable relative to the axis into positive engagement with the first jaw clutch member, a second friction clutch member rotatable about the axis and supported by the second jaw clutch member for relative axial movement and limited relative rotation between the second members, spring means reacting between the second members for biasing the second friction member into frictional engagement with the first friction member, blocker means coacting between the second members and operative in response to the frictional engagement and non-synchronous rotation between the first and second members to prevent the positive engagement until substantial synchronism exists, and stop means coacting between the second members for preventing the frictional engagement until the second jaw clutch member is moved toward engagement with the first jaw clutch member.

BRIEF DESCRIPTION OF THE DRAWINGS

The preferred embodiment of the invention is shown in the accompanying drawings in which.

Certain terminology referring to direction and motion will be used in the following description. The terminology is for convenience in describing the preferred embodiment and should not be considered limiting unless explicitly used in the claims.

DETAILED DESCRIPTION OF THE DRAWINGS

Figure 1:
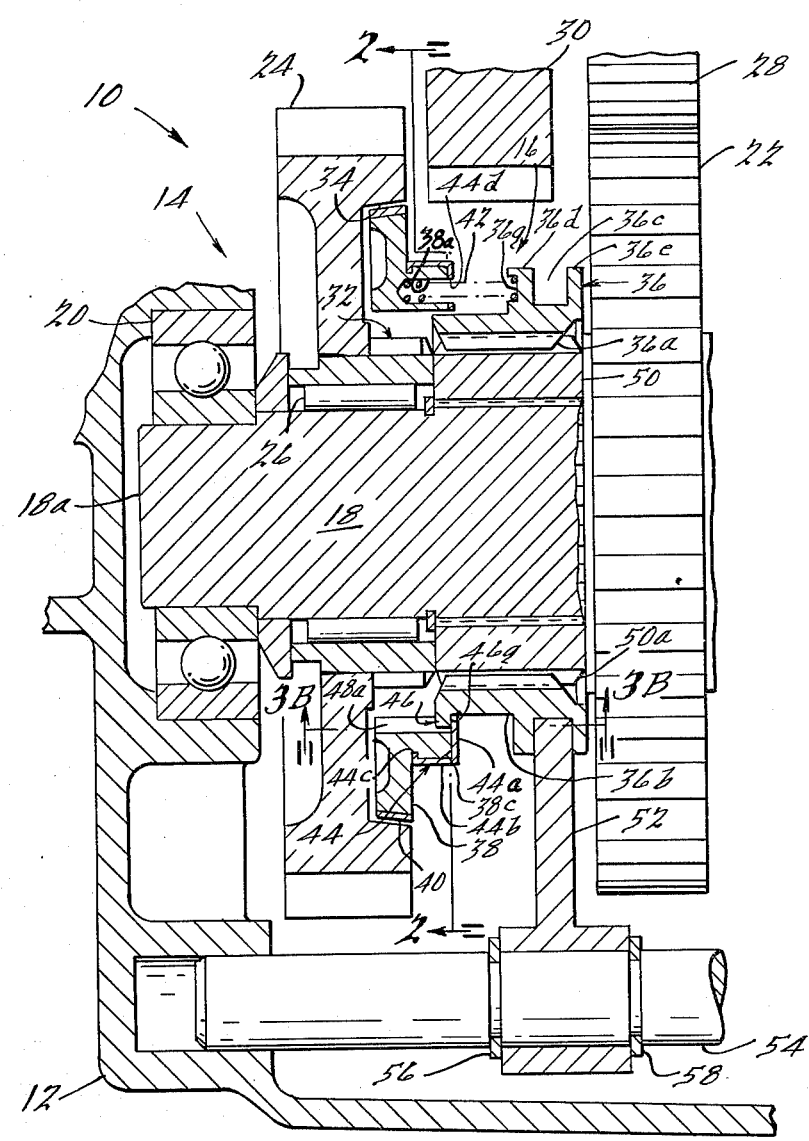
FIG. 1 is a sectional view looking along line 1—1 of FIG. 2.

Referring to FIG. 1, therein is shown a portion of a transmission 10 adapted for use in an unshown land vehicle, but not limited to such use. Transmission 10 includes a partially shown housing 12 and a partially shown countershaft assembly 14 incorporating therein a synchronizer 16 of the present invention.

Countershaft assembly 14 includes a shaft 18 rotatably supported at one end 18a by a bearing 20 supported by the housing and supported at the unshown end in a like manner, a forward drive gear 22 rotatable relative to and supported by shaft 18, a reverse drive gear 24 rotatable relative to and supported by shaft 18 via a roller bearing 26, and synchronizer 16 interposed between gears 22 and 24. Forward drive gear 22 is driven by a gear 28 which is driven by an unshown input shaft. Reverse drive gear is driven by gear 30 via an unshown idler gear assembly. Gear 30 is also driven by the unshown input shaft. Gear 22 is selectively connected to shaft 18 via an unshown clutch. Further details of transmission 10 may be found in the previously mentioned U.S. application, Ser. No. 884,078.

Figure 2:
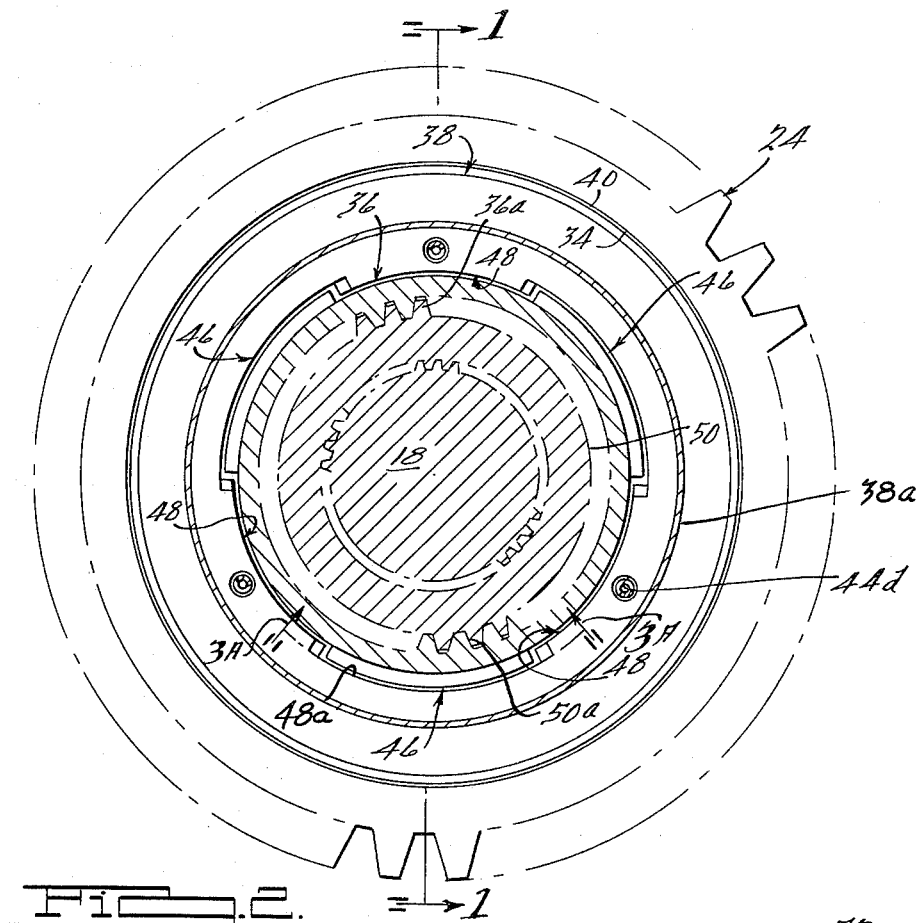
FIG. 2 is a sectional view taken along line 2—2 of FIG. 1.
Figure 3:
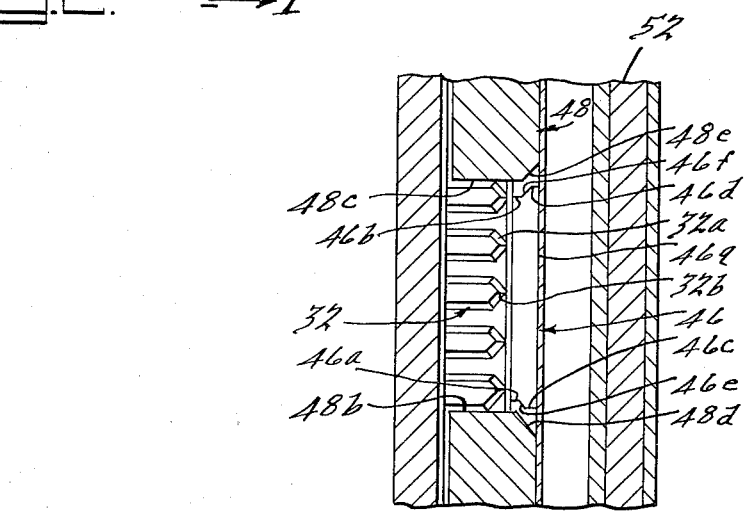
FIG. 3 is a sectional view taken along line 3A—3A of FIG. 2 and along line 3B—3B of FIG. 1.

Looking now at FIGS. 1, 2, and 3, synchronizer 16 includes a first clutch means including a first set of jaw clutch teeth 32 and a first cone friction surface 34, a second clutch means including an annular clutch member 36 having a second set of jaw clutch teeth 36a defined on its I.D., a friction clutch member 38 including a second cone friction surface 40, three circumferentially disposed helical springs 42 for biasing friction surface 40 toward friction surface 34, a stop means 44 for preventing engagement of the friction surfaces while clutch member 36 is in the disengaged position (as shown), and three sets of blockers 46 and 48, respectively, defined by members 36 and 38 and for preventing engagement of jaw clutch teeth 36a and 32 while a substantial rotational speed difference exists between shaft 18 and gear 24. Springs 42, which react axially between members 36 and 38, are preloaded to apply a positive but light force, which force may be in the range of 6–12 pounds. This resilient force provides the initial engaging force of the friction clutch and maintains blockers 46 and 48 in proper circumferential alignment with each other while clutch member 36 is in the disengaged position.

Jaw clutch teeth 32 and friction surface 34 are integrally formed with gear 24 and therefore rotate with the gear. The specific shape of teeth 32 and 36a are well known. Teeth 32, which are best seen in FIGS. 1 and 3, have on their leading edge, with respect to teeth 36a, chamfer faces 32a and rake faces or edges 32b. The chamfer faces 32a are disposed at an angle of 45 degrees with respect to the longitudinal extent of the teeth and the rake edges 32b are disposed at an angle of 20 degrees with respect to the radial extent of the teeth. The chamfer faces 32a may be dispensed with and the angle of the rake faces may be made between 30 and 40 degrees. The exact rake angle and the advantages thereto are explained in detail in U.S. Pat. No. 3,265,173. The cone shape of friction surface 34, which herein is defined by gear 24, may have other well known shapes and may be defined by other well known structure which is fixed to rotate with gear 24. The specific shape of teeth 32 and friction surface 34 forms no part of the present invention.

Jaw clutch member 36 is supported by shaft 18 via a ring member 50 splined on its I.D. to the shaft and having splines 50a on its O.D. which slidably receive jaw clutch teeth 36a, whereby member 36 is retained against rotation relative to shaft 18 and allowed to slide axially relative to the shaft for engaging teeth 36a and 32.

Annular clutch member 36 includes, in addition to jaw clutch teeth 36a and blockers 46, a cylindrical surface 36b from which blockers 46 project and an annular groove 36c defined by radially extending flanges 36d and 36e. Flange 36d is provided with recesses 36g for retaining one end of springs 42. The leading edges of teeth 36a, juxtaposed the leading edges of teeth 32, are provided with chamfer and rake faces identical to those on teeth 32.

Each blocker 46 includes a minor arcuate or circumferential width defined by end surfaces 46a and 46b, a major arcuate or circumferential width defined by end surfaces 46c and 46d, blocker teeth surfaces or unblocking ramps 46e and 46f and an abutment surface 46g. Surfaces 46e and 46f are disposed at an angle of about 30 degrees with respect to a plane perpendicular to the axis of shaft 18. The exact angle of blocker teeth surfaces 46e and 46f is dependent on several factors which include the radial distance of the blocker teeth surfaces from the axis of rotation, the coefficient of friction between the blocker teeth surfaces, the radial distance of friction surfaces 34 and 40 from the axis of rotation, and the coefficient of friction between the friction surfaces.

Friction member 38 includes, in addition to friction surface 40 and blockers 48, three blind bores 38a which retain the other end of springs 42. Friction surface 40 may be defined by the material defining member 38 or, as herein, by a friction material such as bronze which is secured to member 38 in a conventional manner.

Blocker portion 48, defined on the I.D. of member 38, includes three axially extending grooves 48a which are bounded by axially extending surfaces 48b and 48c and notches which define blocker teeth surfaces or unblocking ramps 48d and 48e disposed parallel to their respective unblocking ramps 46e and 46f. Each groove 48a has an arcuate or circumferential width slightly greater than the major arcuate width of each blocker portion 46 for allowing sliding movement of blocker portions 46 therein when same are axially aligned with the grooves.

Stop means 44, which is formed from sheet metal, includes a radially extending flange 44a which contacts abutment surfaces 46g to prevent engagement of friction surfaces 34 and 40 by springs 42 when member 36 is in the disengaged position shown, an axially extending portion 44b, and a short radially extending lip 44c received in an annular groove in member 38. A beveled shoulder 38c provides a pilot for assembling the stop means on member 38. Flange 44a is provided with unshown cutouts for sliding the flange over blocker portions 46 and holes 44d to allow passage of springs 42. Stop 44 may be secured against rotation relative to member 38 by unshown screws. The position of flange 44a and abutment surface 46g fixes the axial spacing between friction surfaces 34 and 40 to a distance less than the axial spacing between the jaw clutch teeth 32 and 36a, whereby initial movement of member 36 will effect engagement of the friction clutch member prior to engagement of the jaw clutch members.

Annular groove 36c in member 36 receives a shifter fork 52 which is secured to a shift rod 54 via snap rings 56 and 58. Shift rod 54 may be connected to any of several well known but unshown actuators, such as air, vacuum, hydraulic, electrical, or manual. Herein a hydraulic actuator is contemplated which is selectively operative to apply a force for sliding member 36 from its first or unengaged position to its second or engaged position and vice versa.

OPERATION

Assume gear 24 is rotating faster than shaft 18 in a clockwise direction, as viewed in FIG. 2. Initial axial movement of member 36, by an axial force applied through shifter fork 52, is transmitted to friction member 38 by springs 42 which then resiliently urge friction surface 40 into engagement with friction surface 34. During non-synchronous rotation, this resilient engagement of the friction surfaces via springs 42 transmits a clockwise synchronizing torque to member 38 which rotates member 38 clockwise relative to member 36 until unblocking ramps 48d engage unblocking ramps 46e. Thereafter, the full axial force on member 36 from shifter fork 52 is transmitted to member 38 via the ramps. The full axial force increases the frictional engagement of surfaces 34 and 40 for increasing the clockwise synchronizing torque on member 38 and imparts a counterclockwise unblocking torque to member 38 relative to member 36. During conditions of substantial non-synchronous rotation, this counterclockwise unblocking torque is less than the clockwise synchronizing torque due to the self-engaging characteristics of the cone clutch and due to the angle of the ramps. Hence, surfaces 46a and 48b will engage for transmitting the clockwise synchronizing torque to shaft 18 via member 36 and for preventing axial force components of the synchronizing torque being transmitted through the ramps to stop flanges 44a. As substantial synchronism is reached, the clockwise synchronizing torque drops below the counterclockwise unblocking torque, thereby aligning blockers 46 with grooves 48a and allowing engagement of jaw clutch teeth 36a with jaw clutch teeth 32 to effect positive coupling of gear 24 with shaft 18.

Operation when shaft 18 is rotating faster than gear 24 in the clockwise direction involves surfaces 46b and 48c, ramps 46f and 48e, and reversal of the torque direction.

The preferred embodiment of the invention has been disclosed for illustrative purposes. Many variations and modifications of the preferred embodiment are believed to be within the spirit of the invention. The following claims are intended to cover the inventive portions of the preferred embodiment and the variations and modifications within the spirit of the invention.

What is claimed is:

1. A synchronizer comprising:

first and second jaw clutch members disposed for relative rotation about a common axis, said second jaw clutch member including an outer circumferential surface, and said second member mounted for movement along said axis from a first position to a positive engagement position in response to an actuating force applied thereto;

first and second friction clutch members disposed for rotation about said axis, said first friction clutch member fixed against rotation and axial movement relative to said first jaw clutch member, and said second friction clutch member including an inner circumferential surface slidably receiving said outer surface and supported thereon for relative axial and limited rotational movement therebetween;

resilient means reacting between said second members for resiliently moving said second friction clutch member into frictional engagement with said first friction clutch member in response to initial movement of said second jaw clutch member toward said positive engagement position, said frictional engagement for effecting said limited relative rotation;

blocker means coacting between said second members, said blocker means operative to engage during substantial nonsynchronous rotation between said first and second members and in response to said frictional engagement effecting said limited relative rotation for preventing said positive engagement until substantial synchronism exists, said blocker means including a plurality of arcuately shaped blockers projecting radially outward from and circumferentially spaced about said outer surface, the circumferential ends of said blockers having radially extending unblocking ramp surfaces obliquely facing opposite circumferential directions, and a plurality of axially extending grooves in said inner surface, each groove having an arcuate width slightly greater than the arcuate width of each blocker for slidably receiving one of said blockers therein, each of said grooves having a notched portion at each circumferential end for increasing the arcuate width of the groove in both circumferential directions and for defining radially extending unblocking ramp surfaces obliquely facing in opposite circumferential directions into said groove, said notches for receiving the circumferential ends of said blockers to allow said limited relative rotation, said unblocking ramp surfaces operative during said substantial nonsynchronous rotation to engage for preventing axial sliding movement of said blockers and for transmitting said actuating force from said second jaw clutch member to said second friction clutch member, and said unblocking ramp surfaces operative during said substantial synchronous rotation to engage for aligning said blockers with said groove, thereby allowing said actuating force to move said second jaw clutch member axially relative to said second friction member and into positive engagement with said first jaw clutch member; and stop means coacting between said second members for preventing said frictional engagement prior to said initial movement, said stop means including an abutment surface defined by one of said blockers, and a flange fixed to said second friction clutch member, said flange operative to contact said abutment surface for limiting axial movement of said second friction clutch member by said resilient means to a position wherein the axial spacing between said friction members is slightly less than the axial spacing between said jaw clutch members while said second jaw clutch member is in said first position, whereby initial movement of said second jaw clutch member effects said frictional engagement through said resilient means prior to said positive engagement for effecting said limited relative rotation and said unblocking ramp surface engagements during said substantial nonsynchronous rotation.

2. The synchronizer of claim 1, wherein said resilient means biases said stop means into engagement with a positive force while said second jaw clutch member is in said first position.

3. In a synchronizer clutch including a friction clutch having first and second friction members for synchronizing a gear with a shaft, a positive clutch having first and second jaw members, respectively defining first and second sets of jaw teeth engagable to connect the gear with the shaft in response to an actuating force moving one of the jaw members axially along the shaft from a first position to an engaged position; the improvement comprising:

inner and outer circumferential surfaces defined by said second friction member;

inner and outer circumferential surfaces defined by said second jaw member, one of said surfaces defining thereon said second set of jaw teeth and the other surface juxtaposed one of said second friction member surfaces in a telescopic manner, and said second set of jaw teeth also securing said second jaw member for rotation with said shaft;

resilient means reacting between said second jaw and friction members for resiliently engaging said friction clutch in response to initial axial movement of said one jaw member by said actuating force;

stop means interposed between said juxtaposed inner and outer circumferential surfaces of said second jaw and friction member for preventing engagement of the friction clutch by said resilient means prior to said initial axial movement; and blocker means defined on said juxtaposed surfaces, said blocker means allowing axial and limited relative rotation between said second jaw and friction members, and said blocker means operative to engage in response to asynchronous engagement of said friction clutch for preventing asynchronous engagement of said positive clutch.

4. The synchronizer clutch of claim 3, wherein said stop means includes:

an abutment surface defined on the outer circumferential surface of said second jaw member; and a flange fixed to said second friction member, said flange operative to contact said abutment surface for limiting movement of said second friction member by said resilient means to a position wherein axial spacing between said friction members is slightly less than axial spacing between adjacent ends of said first and second sets of jaw teeth while said second jaw clutch member is in said first position, whereby said initial movement by said actuating force effects engagement of said friction clutch prior to engagement of said positive clutch.

5. In a synchronizer clutch including a friction clutch having first and second friction members for synchronizing a gear with a shaft, a positive clutch having first and second jaw members, respectively defining first and second sets of jaw teeth engagable to connect the gear with the shaft in response to an actuating force moving one of the jaw members axially along the shaft from a first position to an engaged position; the improvement comprising:

- inner and outer circumferential surfaces defined by said second friction member
- inner and outer circumferential surfaces defined by said second jaw member, one of said surfaces defining thereon said second set of jaw teeth and the other surface juxtaposed one of said second friction member surfaces in a telescopic manner, and said second set of jaw teeth also securing said second jaw member for rotation with said shaft;
- resilient means reacting between said second jaw and friction members for resiliently engaging said friction clutch in response to initial axial movement of said one jaw member by said actuating force;
- blocker means defined on said juxtaposed surfaces of said second jaw and friction members, said blocker means allowing axial and limited relative rotation between said second jaw and friction members, and said blocker means operates to engage in response to asynchronous engagement of said friction clutch for preventing asynchronous engagement of said positive clutch; and
- stop means including an abutment surface defined by a portion of one of said blocker means defined on one of said juxtaposed surfaces of said second jaw and friction members and a flange fixed to the other of said second jaw and friction members, said flange biased into contact with said abutment surface by said resilient means for setting an axial spacing between said friction members which is slightly less than the axial spacing between adjacent ends of said first and second jaw teeth while the jaw member movable by said actuating force is in said first position.

6. The synchronizer clutch of claim 3, or 5 wherein said second set of jaw teeth are internal jaw teeth defined on the inner circumferential surface of said second jaw member and are operative to slidably secure said second jaw member for rotation with said shaft.

7. The synchronizer clutch of claim 3 or 5, wherein said actuating force axially moves said second jaw member and said resilient means resiliently moves said second friction member into engagement with said first friction member in response to said initial movement of said second jaw member.

8. The synchronizer clutch of claim 3 or 5, wherein said blocker means includes:

- a plurality of blocker teeth projecting radially outward from said outer circumferential surface of said second jaw member, each of said teeth defining an unblocking ramp; and
- a plurality of axially extending grooves in said inner circumferential surface of said second friction member slidably receiving said blocker teeth, each of said grooves including a notch portion increasing the circumferential width of a portion of each groove and defining an unblocking ramp, said notched portions for receiving said blocker teeth to allow said limited relative rotation and block positive engagement of said first and second sets of jaw teeth, and said unblocking ramps operative to effect a limited counter relative rotation between said second members to allow said positive engagement as synchronism is reached.

9. The synchronizer clutch of claim 8, wherein said unblocking ramps are operative when engaged to transmit said actuating force from said second jaw member to said second friction member for applying an increased frictional engagement effective to bring said members into synchronism.

10. The synchronizer of claim 8, wherein said second set of jaw teeth are internal jaw teeth defined on the inner circumferential surface of said second jaw member and are operative to slidably secure said second jaw member for rotation with said shaft, said actuating force axially moves said second jaw member, and said resilient means resiliently moves said second friction member into engagement with said first friction member in response to said initial movement of said second jaw member by said actuating force.

* * * * *